(12) United States Patent
Sato

(10) Patent No.: US 11,904,720 B2
(45) Date of Patent: Feb. 20, 2024

(54) INFORMATION PROCESSING APPARATUS, INFORMATION PROCESSING METHOD, AND STORAGE MEDIUM

(71) Applicant: HONDA MOTOR CO., LTD., Tokyo (JP)

(72) Inventor: Taichiro Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 337 days.

(21) Appl. No.: 17/329,199

(22) Filed: May 25, 2021

(65) Prior Publication Data

US 2021/0370792 A1 Dec. 2, 2021

(30) Foreign Application Priority Data

May 28, 2020 (JP) .................................. 2020-093085

(51) Int. Cl.
| | |
|---|---|
| *G01C 21/34* | (2006.01) |
| *B60L 53/66* | (2019.01) |
| *B60L 53/53* | (2019.01) |
| *B60L 50/60* | (2019.01) |

(52) U.S. Cl.
CPC .............. *B60L 53/66* (2019.02); *B60L 50/66* (2019.02); *B60L 53/53* (2019.02); *G01C 21/3476* (2013.01)

(58) Field of Classification Search
CPC . G01C 21/34; B60L 3/00; B60L 50/60; B60L 53/66; B60L 53/53; H01M 10/44
See application file for complete search history.

(56) References Cited

U.S. PATENT DOCUMENTS

| | | |
|---|---|---|
| 2012/0203409 A1 | 8/2012 | Sekijima et al. |
| 2013/0226441 A1* | 8/2013 | Horita ...................... B60Q 9/00 701/117 |

(Continued)

FOREIGN PATENT DOCUMENTS

| | | |
|---|---|---|
| EP | 3886007 | 9/2021 |
| JP | 09-210702 | 8/1997 |

(Continued)

OTHER PUBLICATIONS

Japanese Notice of Allowance for Japanese Patent Application No. 2020-093085 dated Oct. 24, 2023.

*Primary Examiner* — Tan Q Nguyen
(74) *Attorney, Agent, or Firm* — Amin, Turocy & Watson, LLP

(57) ABSTRACT

An information management apparatus acquires location information of one or more vehicles having electric power of only a first battery as a power source and a remaining level of the electric power of the first battery, acquires information of a surplus power accumulated in a second battery that is installed in each of a plurality of facilities and is capable of supplying electric power to devices installed in the facility and location information of the facility, and provides the location information of the facility to the vehicle in a case in which the remaining level of the electric power of the first battery is equal to or lower than a first threshold, the facility being in which the second battery of which the surplus power is equal to or higher than a second threshold is disposed and being present within a predetermined distance from a vehicle.

10 Claims, 8 Drawing Sheets

(56) References Cited

U.S. PATENT DOCUMENTS

| | | | | |
|---|---|---|---|---|
| 2014/0214321 | A1* | 7/2014 | Kawamata | G01C 21/3476 |
| | | | | 340/901 |
| 2014/0371969 | A1* | 12/2014 | Asai | B60L 58/40 |
| | | | | 701/22 |
| 2015/0286965 | A1* | 10/2015 | Amano | B60L 53/68 |
| | | | | 705/5 |
| 2015/0298565 | A1* | 10/2015 | Iwamura | G06Q 10/04 |
| | | | | 701/22 |
| 2017/0194802 | A1* | 7/2017 | Edwards | H02J 7/00 |
| 2019/0139161 | A1* | 5/2019 | Sakuma | G06Q 10/02 |
| 2020/0380429 | A1* | 12/2020 | Kawamoto | G06Q 10/083 |
| 2021/0086647 | A1* | 3/2021 | Kiessling | B60L 53/67 |
| 2021/0213844 | A1* | 7/2021 | Singuru | H02J 7/00034 |

FOREIGN PATENT DOCUMENTS

| | | |
|---|---|---|
| JP | 2011-142779 | 7/2011 |
| JP | 2012-181183 | 9/2012 |
| JP | 2013-020488 | 1/2013 |
| JP | 2013-109764 | 6/2013 |
| JP | 2016-071843 | 5/2016 |
| JP | 2017-117636 | 6/2017 |
| JP | 2018-147029 | 9/2018 |
| JP | 2020-086657 | 6/2020 |

* cited by examiner

382

| VEHICLE | DESTINATION | SOC | LOCATION INFORMATION |
|---------|-------------|------|----------------------|
| 001 | (X5, Y5) | ○○% | (X10, Y10) |
| 002 | (X6, Y6) | ××% | (X12, Y12) |
| 003 | (X7, Y7) | △△% | (X13, Y13) |

| POWER SUPPLY FACILITY | PROVIDABLE DATE AND TIME | SUPPLY CONDITIONS | LOCATION INFORMATION | POWER INDEX |
|---|---|---|---|---|
| 001 | 2020/05/15 09:00-18:00 | DEGREE OF ACCUMULATED POWER IS EQUAL TO OR HIGHER THAN ○○ | (X1, Y1) | XXX |
| 002 | 2020/05/14 09:00-18:00 | DEGREE OF ACCUMULATED POWER IS EQUAL TO OR HIGHER THAN ×× | (X2, Y2) | YYY |
| 003 | 2020/05/15 12:00-21:00 | DEGREE OF ACCUMULATED POWER IS EQUAL TO OR HIGHER THAN △△ | (X3, Y3) | ZZZ |

| SUPPLY FACILITY | RESERVED TIME | USER ID |
|---|---|---|
| 001 | 2020/05/15 17:00-18:00 | A001 |
| 002 | | |
| 003 | | |

| POWER SUPPLY FACILITY | NUMBER OF TIMES OF SUPPLY | SUPPLY TIME | SUPPLIED POWER | AMOUNT OF MONEY |
|---|---|---|---|---|
| 001 | 2 | 2h | ○○W | ○○○YEN |
| 002 | 2 | 1h | ××W | ×××YEN |
| 003 | 3 | 4h | △△W | △△△YEN |

INFORMATION PROCESSING APPARATUS, INFORMATION PROCESSING METHOD, AND STORAGE MEDIUM

CROSS-REFERENCE TO RELATED APPLICATION

Priority is claimed on Japanese Patent Application No. 2020-093085, filed May 28, 2020, the content of which is incorporated herein by reference.

BACKGROUND

Field of the Invention

The present invention relates to an information processing apparatus, an information processing method, and a storage medium.

Description of Related Art

Conventionally, charging control systems that determine a location of a charging stand matching an electric vehicle on the basis of information of a current location of the electric vehicle and location information of charging stands provided by a control center have been disclosed (Japanese Unexamined Patent Application, First Publication No. 2013-109764).

There are cases in which the convenience of the conventional technology described above is not sufficient for suppliers of electric power and consumers of electric power.

SUMMARY

The present invention is in view of such situations, and one object thereof is to provide an information processing apparatus, an information processing method, and a storage medium capable of improving convenience of suppliers of electric power and consumers of the electric power.

An information processing apparatus, an information processing method, and a storage medium according to the present invention employ the following configurations.

(1) According to one aspect of the present invention, there is provided an information management apparatus including: a memory that stores instructions, and one or more processors that execute the instructions to: acquire location information of one or more vehicles having electric power of only a first battery as a power source and a remaining level of the electric power of the first battery, acquire information of a surplus power accumulated in a second battery that is installed in each of a plurality of facilities and is capable of supplying electric power to devices installed in the facility and location information of the facility, and provide the location information of the facility to the vehicle by referring to the location information of the vehicle and the location information of the facility in a case in which the remaining level of the electric power of the first battery is equal to or lower than a first threshold, the facility being in which the second battery of which the surplus power is equal to or higher than a second threshold is disposed and being present within a predetermined distance from a vehicle.

(2) In the aspect (1) described above, the facilities are facilities different from charging facilities used only for supplying electric power to mobile bodies including a vehicle and may be houses, stores, or factories.

(3) In the aspect (1) or (2) described above, the devices disposed in the facilities are home electric appliances disposed in a house, facilities that are disposed in a store for operating the store, or devices used for manufacturing a product in a factory.

(4) In any one of the aspects (1) to (3) described above, the one or more processors that are configured to execute the instructions to: assign a compensation to a manager of the second battery based on a supplied electric power in a case in which electric power accumulated in the second battery is supplied to the first battery.

(5) In any one of the aspects (1) to (4) described above, the surplus power is an electric power based on an index acquired by subtracting an electric power assumed to be used in the facility from the electric power accumulated in the second battery.

(6) In any one of the aspects (1) to (5) described above, the one or more processors that are configured to execute the instructions to: refer to conditions designated by a manager of the second battery, extracts a facility present within a predetermined distance from the vehicle, and supply location information of the extracted facility to the vehicle.

(7) In any one of the aspects (1) to (6) described above, the one or more processors that are configured to execute the instructions to: acquire a state of the second battery when the second battery is supplying electric power to the first battery and detect an abnormality of the second battery on the basis of the acquired state.

(8) In any one of the aspects (1) to (7) described above, the electric power accumulated in the second battery includes electric power provided by a power generation device that is disposed in the facility and generates power using sunlight.

(9) In any one of the aspects (1) to (8) described above, the second battery is a battery mounted in the vehicle before being installed in the facility.

(10) According to another aspect of the present invention, there is provided an information processing method using a computer, the information processing method including: acquiring location information of one or more vehicles having electric power of only a first battery as a power source and a remaining level of the electric power of the first battery; acquiring information of a surplus power accumulated in a second battery that is installed in each of a plurality of facilities and is capable of supplying electric power to devices installed in the facility and location information of the facility; and providing the location information of the facility to the vehicle by referring to the location information of the vehicle and the location information of the facility in a case in which the remaining level of the electric power of the first battery is equal to or lower than a first threshold, the facility being in which the second battery of which the surplus power is equal to or higher than a second threshold is disposed and being present within a predetermined distance from a vehicle.

(11) According to yet another aspect of the present invention, there is provided a non-transitory computer storage medium storing a program causing a computer to execute: acquire location information of one or more vehicles having electric power of only a first battery as a power source and a remaining level of the electric power of the first battery; acquire information of a surplus power accumulated in a second battery that is installed in each of a plurality of facilities and is capable of supplying electric power to devices installed in the facility and location information of the facility; and provide the location information of the facility to the vehicle by referring to the location information of the vehicle and the location information of the facility in a case in which the remaining level of the electric power of the first battery is equal to or lower than a first threshold, the facility being in which the second battery of which the surplus power is equal to or higher than a second threshold is disposed and being present within a predetermined distance from a vehicle.

According to the aspects (1) to (11) described above, the convenience of suppliers of electric power and consumers of electric power can be improved.

BRIEF DESCRIPTION OF THE DRAWINGS

FIG. 6 is a diagram showing an example of details of facility information.

FIG. 7 is a diagram showing an example of details of reservation information.

FIG. 8 is a diagram showing an example of details of usage information.

DETAILED DESCRIPTION

Hereinafter, an information management apparatus, an information processing method, and an information processing system including a storage medium according to embodiments of the present invention will be described with reference to the drawings.

First Embodiment

Figure 1:
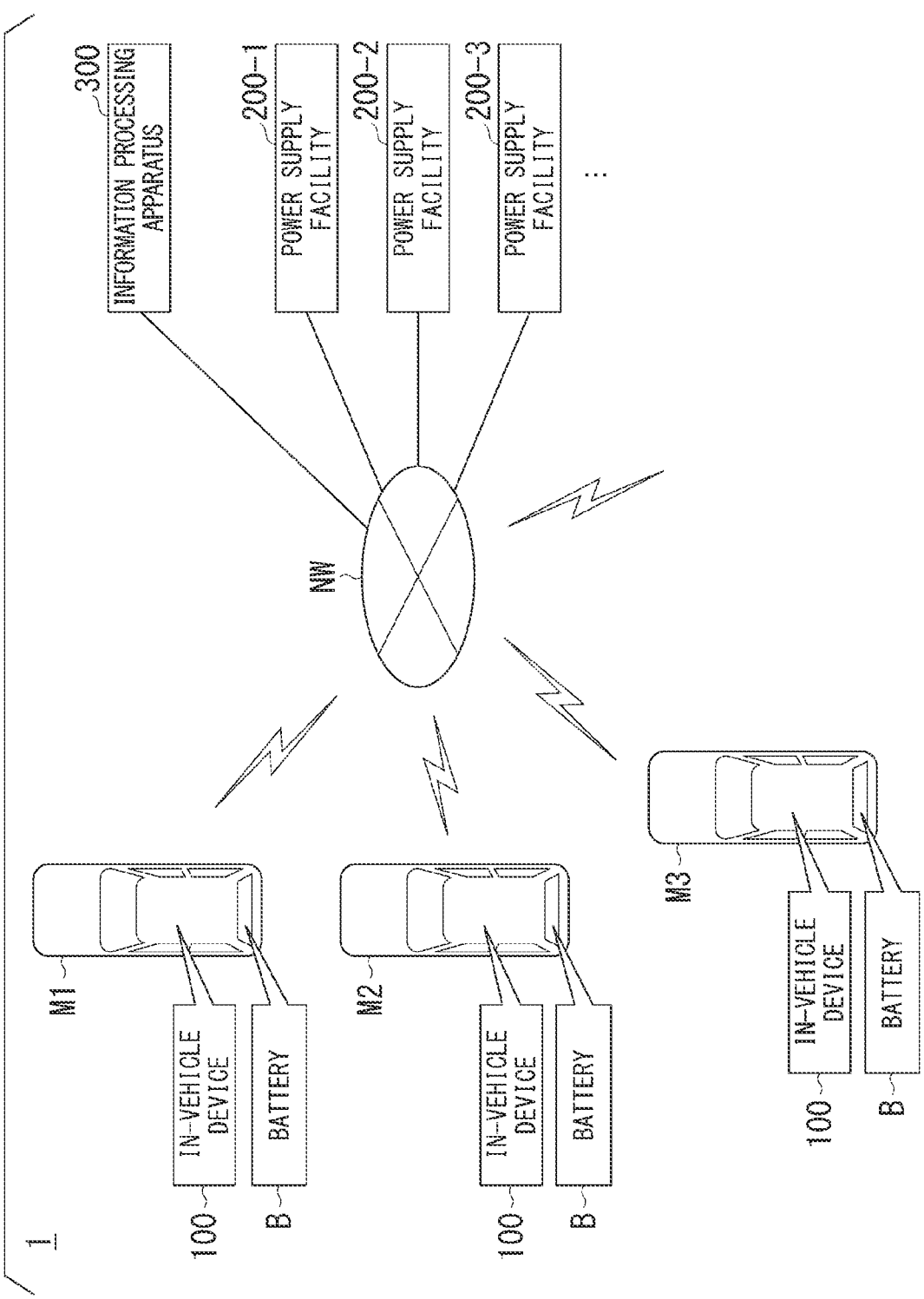
FIG. 1 is a diagram showing an example of the configuration of an information processing system 1 including an information processing apparatus.

FIG. 1 is a diagram showing an example of the configuration of an information processing system 1 including an information processing apparatus 300. For example, the information processing system 1 includes one or more vehicles M (vehicles M1 to M3 in the drawing), one or more power supply facilities 200 (power supply facilities 200-1 to 200-3 in the drawing), and the information processing apparatus 300. The vehicle M, the power supply facility 200, and the information processing apparatus 300 communicate with each other, for example, through a network NW. Examples of the network NW include a cellular network, a Wi-Fi network, Bluetooth (a registered trademark), the Internet, a wide area network (WAN), a LAN, a public line, a provider device, a dedicated line, a radio base station, and the like.

[Vehicle]

The vehicle M is an electric automobile that travels using electric power. For example, the vehicle M is a vehicle that has only electric power of a battery B as a power source. In the vehicle M, for example, a battery B, a motor for traveling, a vehicle control device, a car navigation system, an in-vehicle device 100, and the like are mounted. The vehicle M travels using a drive force of the motor for traveling. The motor for traveling is driven using electric power accumulated in the battery B. For example, the battery B is a secondary battery such as a lithium ion battery that can be repeatedly charged and discharged.

Figure 2:
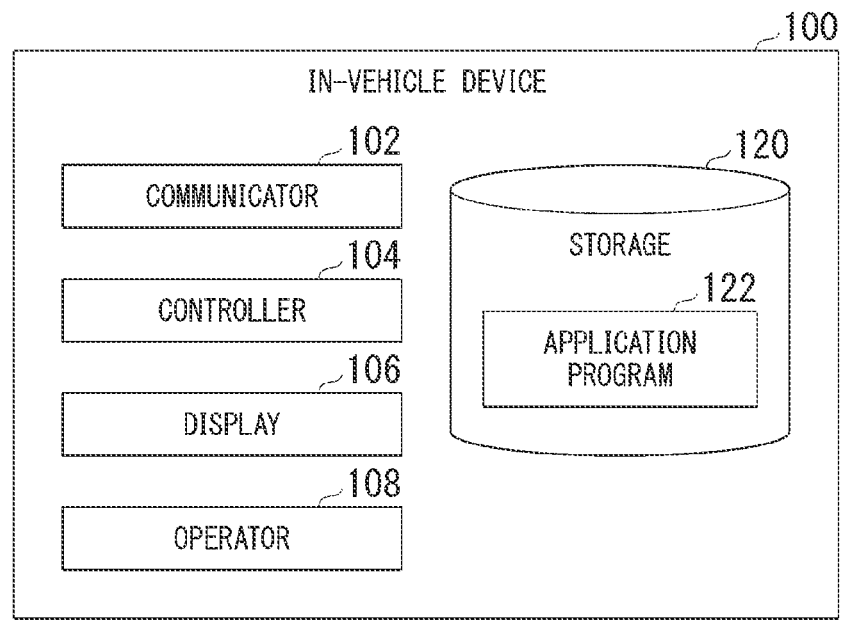
FIG. 2 is a diagram showing an example of the functional configuration of an in-vehicle device.

FIG. 2 is a diagram showing an example of the functional configuration of the in-vehicle device 100. For example, the in-vehicle device 100 includes a communicator 102, a controller 104, a display 106, an operator 108, and a storage 120. The communicator 102 is a communication interface used for communication with the information processing apparatus 300. For example, the controller 104 is realized by a processor such as a central processing unit (CPU) executing an application program 122 (software) stored in the storage 120. Some or all of functions executed by the controller 104 may be realized by hardware such as a large scale integration (LSI), an application specific integrated circuit (ASIC), a field-programmable gate array (FPGA), or the like or may be realized by software and hardware in cooperation. For example, the storage 120 is realized by a storage device including a non-transitory storage medium such as a hard disk drive (HDD), a flash memory, an electrically erasable programmable read only memory (EEPROM), a read only memory (ROM), or the like, a random access memory (RAM), or the like.

The controller 104 communicates with the information processing apparatus 300 using the communicator 102 in accordance with a user's operation and transmits a user's request to the information processing apparatus 300 or performs push notification based on information received from the information processing apparatus 300. The controller 104 causes the display 106 to display information provided by the information processing apparatus 300.

The display 106 is a display device that displays an image. For example, the display is a display device such as a liquid crystal display (LCD), an electroluminescence (EL) display device, or the like. The operator 108 is a button used for operating the display. The display 106 and the operator 108 may be a touch panel in which such functions are integrally configured. In such a case, the operator 108 may be a graphical user interface (GUI) switch displayed on the display 106. The operator 108 may be a mechanical button.

[Power Supply Facility]

The power supply facility 200 is a facility different from charging facilities (charging stands and charging stations) used only for supplying electric power to mobile bodies including vehicles M. For example, the power supply facility 200 is a house, a store, or a factory. In the following description, the power supply facility 200 is assumed to be a house.

Figure 3:
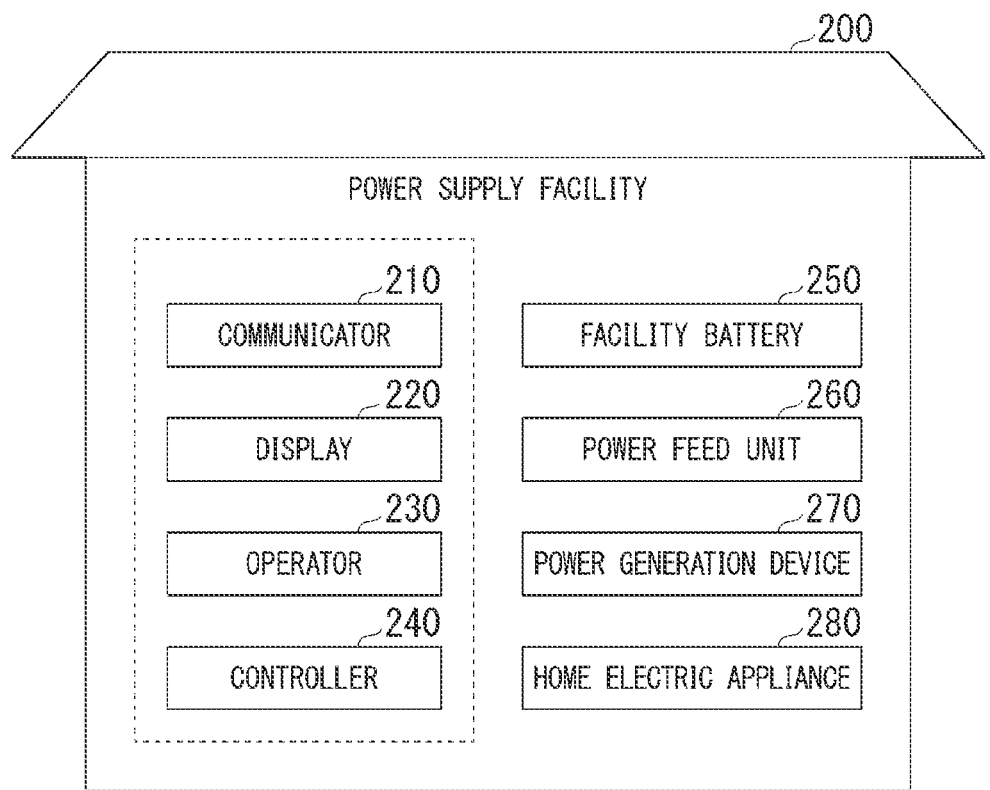
FIG. 3 is a diagram showing an example of the functional configuration included in a power supply facility.

FIG. 3 is a diagram showing an example of the functional configuration included in the power supply facility 200. The power supply facility 200 includes a communicator 210, a display 220, an operator 230, a controller 240, a facility battery 250, a power feed unit 260, a power generation device 270, and home electric appliances 280. For example, such functional configurations may be included in a home energy management system (HEMS).

For example, the controller 240 is realized by a processor such as a CPU executing an application program (software) stored in a storage device. Some or all of functions executed by the controller 240 may be realized by hardware such as an LSI, an ASIC, a FPGA, or the like or may be realized by software and hardware in cooperation.

The communicator 210 is a communication interface used for communication with the information processing apparatus 300. The display 220 is a display device that displays an image. The operator 230 is a button used for operating the display.

The controller 240 controls the functional configurations included in the power supply facility 200. The controller 240 transmits information included in a functional configuration included in the power supply facility 200 or information generated by the functional configuration to the information processing apparatus 300 or acquires information transmitted by the information processing apparatus 300 using the communicator 210.

For example, the facility battery 250 is a secondary battery such as a lithium ion battery that can be repeatedly charged and discharged. The facility battery 250 can be linked with a system power, the power feed unit 260, the power generation device 270, the home electric appliances 280, and the like. For example, the facility battery 250 accumulates system power or electric power supplied to the power generation device 270. The facility battery 250 supplies the accumulated electric power to the power feed unit 260 or the home electric appliances 280.

The power feed unit 260 supplies electric power to the battery B of the vehicle M. For example, the power feed unit 260 converts a voltage or a current of electric power supplied by the facility battery 250 into a predetermined voltage or a predetermined current and provides electric power of the converted voltage or current for the battery B of the vehicle M. For example, by connecting a power line included in the power feed unit 260 to a power feed mechanism of the vehicle M, the power feed unit 260 can supply electric power to the vehicle M.

The power generation device 270 is a power generation device utilizing natural energy, for example, a photovoltaic power generation device generating power using sunlight or the like. The power generation device 270 supplies generated electric power to the facility battery 250.

The home electric appliances 280 are household electric appliances such as an electric washer, a television set, a lighting mechanism, and a refrigerator. The home electric appliances 280 operate using electric power supplied from a system or electric power supplied by the facility battery 250.

[Information Processing Apparatus]

Figures 4, 5:
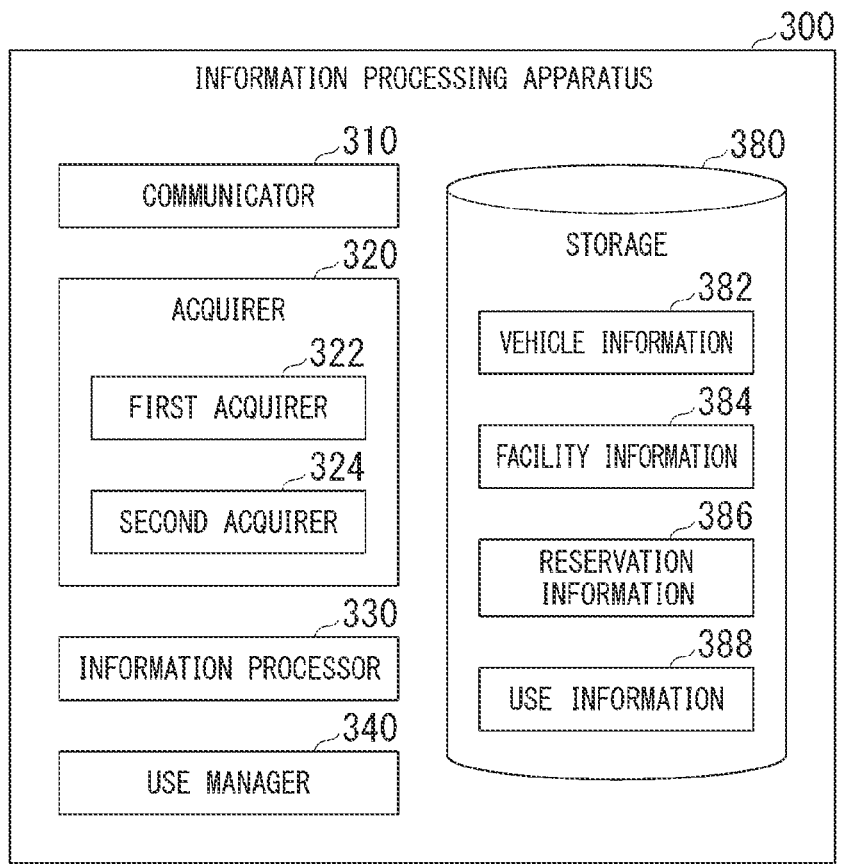
FIG. 4 is a diagram showing an example of the functional configuration of an information processing apparatus.
FIG. 5 is a diagram showing an example of details of vehicle information.

FIG. 4 is a diagram showing an example of the functional configuration of the information processing apparatus 300. For example, the information processing apparatus 300 includes a communicator 310, an acquirer 320, an information processor 330, a use manager 340, and a storage 380. For example, each of the acquirer 320, the information processor 330, and the use manager 340 is realized by a processor such as a CPU executing an application program (software) stored in a storage device. Some or all of such functional members may be realized by hardware such as an LSI, an ASIC, a FPGA, or the like or may be realized by software and hardware in cooperation. For example, the storage 380 is realized by a storage device including a non-transitory storage medium such as a HDD, a flash memory, an EEPROM, a ROM, or the like, a RAM, or the like. One or both of the information processor 330 and the use manager are examples of a "controller".

For example, the storage 380 stores vehicle information 382, facility information 384, reservation information 386, and usage information 388. Such information will be described below.

The communicator 310 is a communication interface used for communicating with other devices through the network NW. For example, the communicator 10 acquires information transmitted by the vehicle M and information transmitted by the power supply facility 200. The communicator 310 acquires a charged state of the battery of the vehicle M, a location of the vehicle M, and the like.

For example, the acquirer 320 includes a first acquirer 322 and a second acquirer 324. The first acquirer 322 acquires vehicle information relating to the vehicle M at predetermined intervals (see FIG. 5). For example, the vehicle information relating to the vehicle M is identification information of the vehicle M, a destination of the vehicle, an index representing a remaining electric power of the battery B of the vehicle M (for example, a state of charge (SOC)), location information of the vehicle M, the distance (not shown) that the vehicle M can travel using electric power accumulated in the battery B, and the like. The vehicle information is stored in the storage 380 as the vehicle information 382. FIG. 5 is a diagram showing an example of details of the vehicle information 382.

The second acquirer 324 acquires facility information relating to the power supply facility 200 at predetermined intervals (see FIG. 6). For example, the facility information relating to the power supply facility 200 is identification information of the power supply facility 200, a providable date and time, supply conditions, location information, a power index representing an electric power that can be provided for the battery B of the vehicle M by the facility battery 250 (surplus power), an index representing a remaining electric power of the facility battery 250 of the power supply facility 200, and the like. The providable date and time is a date and time at which a manager of the power supply facility 200 allows supply of electric power to the battery B of the vehicle M. The supply conditions are conditions relating to supply that can be arbitrarily set by a manager. For example, the supply conditions are an extent of accumulated power of the facility battery 250 being equal to or higher than 80 [%], provision of a designated power (a predetermined amount of electric power) to the battery B of the vehicle M, and the like. The supply conditions may be determined not by manager's designation but by the information processing system 1.

The designated power may be an index such as an amount of power designated by a manager or may be an index acquired on the basis of behaviors and use forms designated by a manager. For example, the index acquired on the basis of designated behaviors and use forms may be the amount of power acquired by subtracting a necessary power amount from the amount of power accumulated in the facility battery 250. The necessary power amount is the amount of electric power if it is assumed that home electric appliances 280 disposed in a facility will be used for a predetermined time or more. For example, a manager designates an electric washer as being used once, an air conditioner as being used for five hours, and the like. The power supply facility 200 derives an amount of power assumed to be used on the basis of designated behaviors. The facility information is stored in the storage 380 as the facility information 384. FIG. 6 is a diagram showing an example of details of the facility information 384.

The information processor 330 processes or manages information that has been acquired by the acquirer 320. For example, the information processor 330 stores information acquired by the acquirer 320 in the storage 380 or provides information stored in the storage 380 for the vehicle M or the power supply facility 200.

In a case in which a remaining level of the battery B of the vehicle M is equal to or lower than a first threshold, the information processor 330 provides location information of power supply facilities 200, in which the facility battery 250 of which a surplus power is equal to or larger than a second threshold is disposed, present within a predetermined distance from the vehicle M for the vehicle M by referring to the location information of the vehicle M and the location information of the power supply facilities 200. At this time, the information processor 330 may derive the amount of power that is necessary for the vehicle M to arrive at a destination and provide location information of the power supply facilities 200 that can provide the derived power amount (the power supply facilities 200 of which a surplus power is equal to or higher than the derived power amount) for the vehicle M.

The use manager 340 manages a reservation for the vehicle M to charge the battery B using the power supply facility 200. The use manager 340 generates reservation information. FIG. 7 is a diagram showing an example of details of reservation information 386. The reservation information 386 includes identification information of a user who has made a reservation, a reservation time, and the like for each power supply facility 200.

In a case in which the vehicle M charges the battery B using the power supply facility 200, the use manager 340 bills a user of the vehicle M or assigns a compensation to a manager of the power supply facility 200. For example, the use manager 340 determines a compensation to be assigned on the basis of a status in which the vehicle M uses the power supply facility 200 for a manager of the power supply facility 200. The amount of money or the like to be assigned is stored in the storage 380 as the usage information 388. Here, "assigning" represents storing of information in which information representing a compensation is associated with a manager who is an assignment target in the storage 380.

FIG. 8 is a diagram showing an example of details of the usage information 388. The usage information 388 includes information such as the number of times the vehicle M has used the power supply facility 200, a time for which the power supply facility 200 has supplied electric power to the vehicle M, an extent of electric power supply to the vehicle M (an amount of power), a compensation assigned to a manager of the power supply facility, and the like for a predetermined period. For example, the compensation is derived on the basis of a function having some or all of the number of times, the time, and the extent of electric power as parameters.

Figure 9:
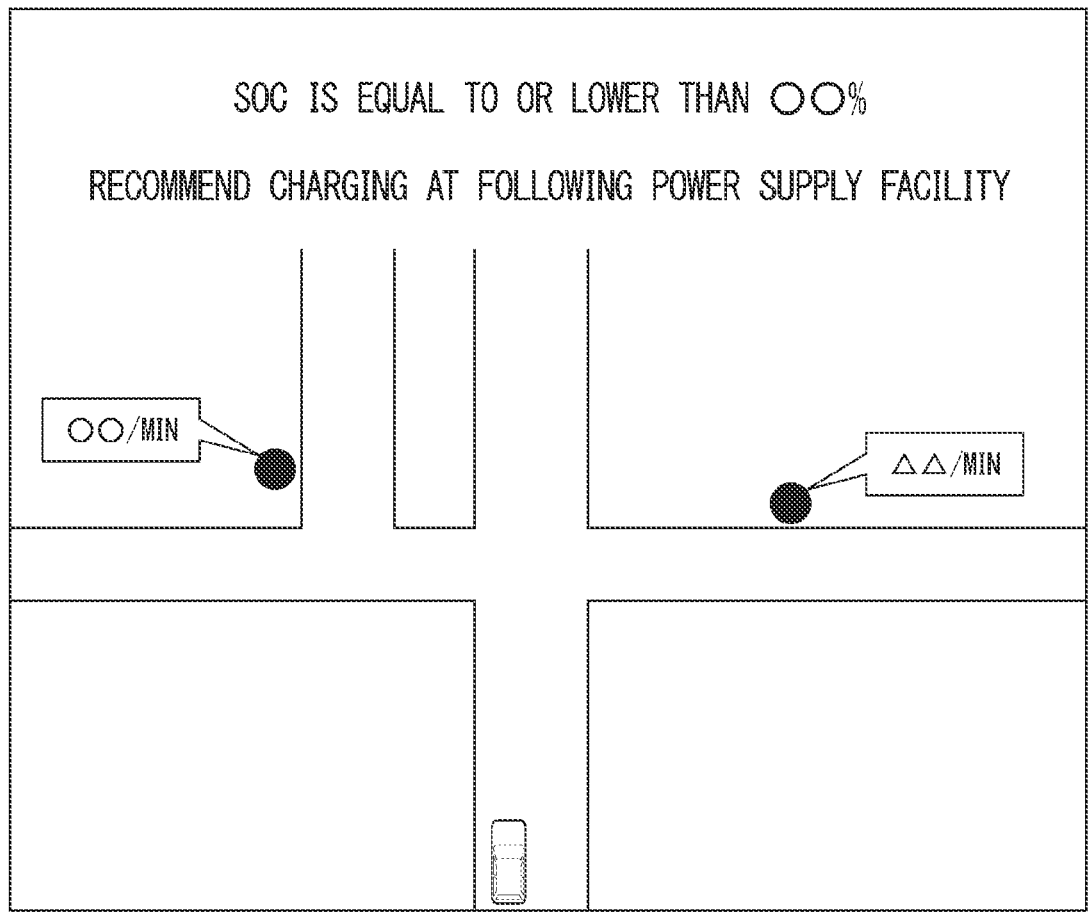
FIG. 9 is a diagram showing an example of an image displayed on a display of a vehicle M.

Hereinafter, a process executed by the information processing system 1 will be described. In a case in which the power amount of the battery B of the vehicle M decreases by a predetermined amount or more, the information processing apparatus 300 provides information of power supply facilities 200 that are present in the vicinity of the vehicle M and can charge the battery B of the vehicle M for the vehicle M. FIG. 9 is a diagram showing an example of an image displayed on the display 106 of the vehicle M. For example, location information of each power supply facility 200 associated with map information, the usage fee at the time of charging at the facility, the time until arrival at the power supply facility 200, the distance to the power supply facility 200, and the like are displayed.

An occupant of the vehicle M can make a reservation for the use of the power supply facility 200 by operating the operator 108 of the vehicle M by referring to an image displayed on the display 106 and charge the battery B using the power supply facility 200. The information processing apparatus 300 assigns a compensation such as money to a manager of the power supply facility 200 on the basis of a usage fee paid by an occupant of the vehicle M.

[Sequence Diagram (1)]

Figure 10:
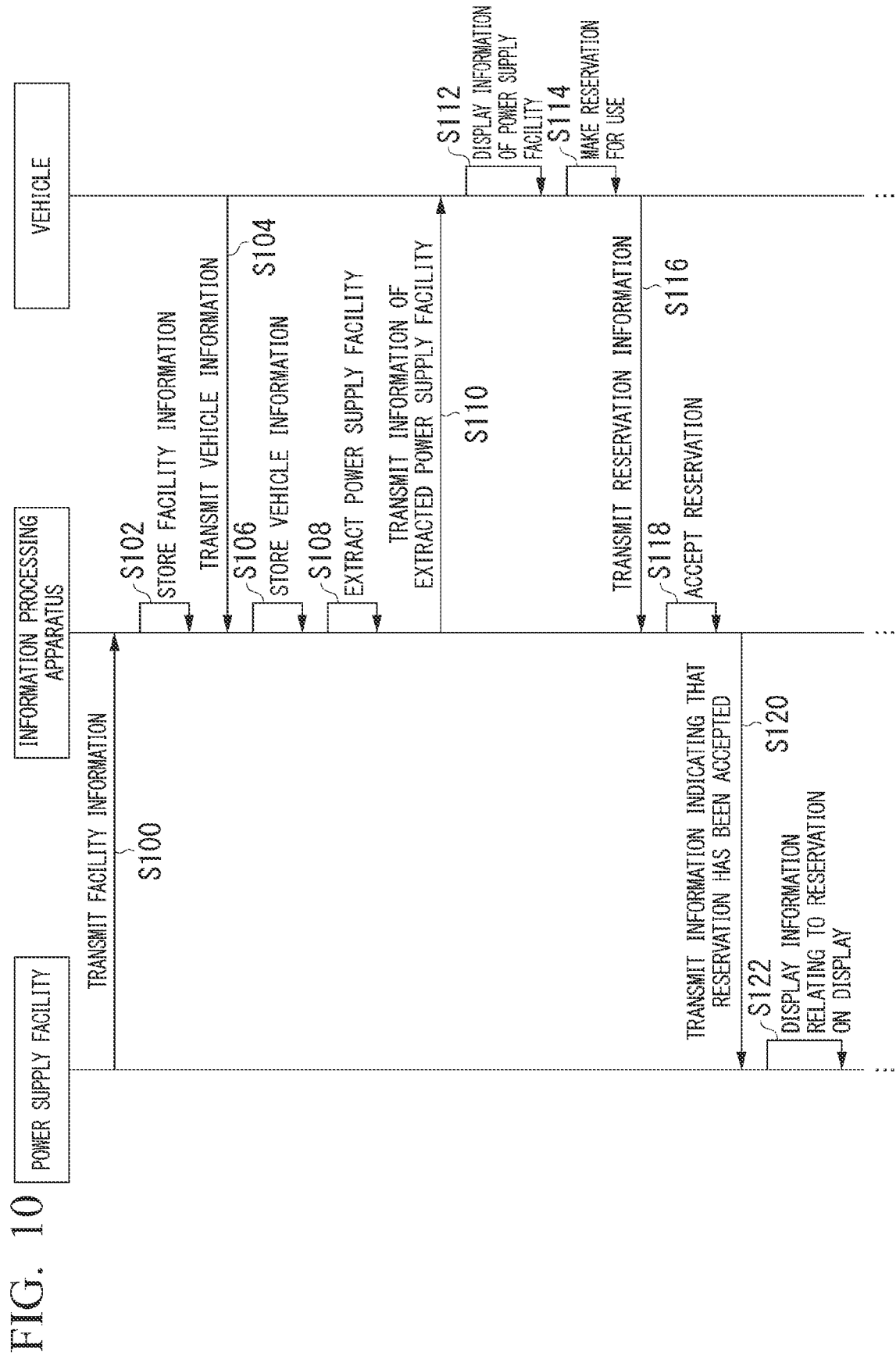
FIG. 10 is a sequence diagram (1) showing an example of the flow of a process executed by an information processing system.

FIG. 10 is a sequence diagram (1) showing an example of the flow of a process executed by the information processing system 1. First, the power supply facility 200 transmits facility information to the information processing apparatus 300 (Step S100). Next, the information processing apparatus 300 acquires the facility information and causes the storage 380 to store the acquired facility information (Step S102). Next, the vehicle M transmits the vehicle information to the information processing apparatus 300 (Step S104). Next, the information processing apparatus 300 acquires the vehicle information and causes the storage 380 to store the acquired vehicle information (Step S106).

Next, in a case in which an SOC included in the acquired vehicle information is equal to or lower than the first threshold, the information processing apparatus 300 extracts power supply facilities 200 that are at a predetermined distance from the vehicle M that has transmitted the vehicle information and can charge the battery B of the vehicle M (Step S108). The information processing apparatus 300 extracts a power supply facility 200 that is present within a predetermined distance from the vehicle M by referring to supply conditions designated by a manager of the facility battery 250 and supplies location information of the extracted power supply facility 200 to the vehicle M. For example, a power supply facility 200 that is allowed to perform charging at the time at which the vehicle M desires to be charged is extracted. Next, the information processing apparatus 300 transmits information of the extracted power supply facility 200 to the vehicle M (Step S110).

Next, the vehicle M causes the display 106 to display the transmitted information of the power supply facility 200 on the display 106 (Step S112). When an occupant of the vehicle M performs an operation of making a reservation for the use of the charging facility 200 using the operator 108 by referring to the information displayed on the display 106 (Step S114), the vehicle M transmits reservation information including identification information of the occupant, the reservation time, and the like to the information processing apparatus 300 (Step S116). Next, the information processing apparatus 300 accepts a reservation on the basis of the reservation information (Step S118). Next, the information processing apparatus 300 transmits information indicating that the reservation has been accepted to the power supply facility 200 (Step S120). The power supply facility 200 causes the display 106 to display the information relating to the reservation (Step S122). The information relating to the reservation may be transmitted to a mobile terminal device such as a smartphone registered in advance in place of the power supply facility 200.

As described above, the information processing apparatus 300 provides information of power supply facilities 200 that can be used for vehicles M of which the SOC of the battery B is equal to or lower than the first threshold, whereby a user's convenience is improved.

Some or all of the above-described processes and a process to be described below (the process of FIG. 11)

performed by the information processing apparatus 300 may be performed by the power supply facility 200 or the vehicle M.

[Sequence Diagram (2)]

Figure 11:
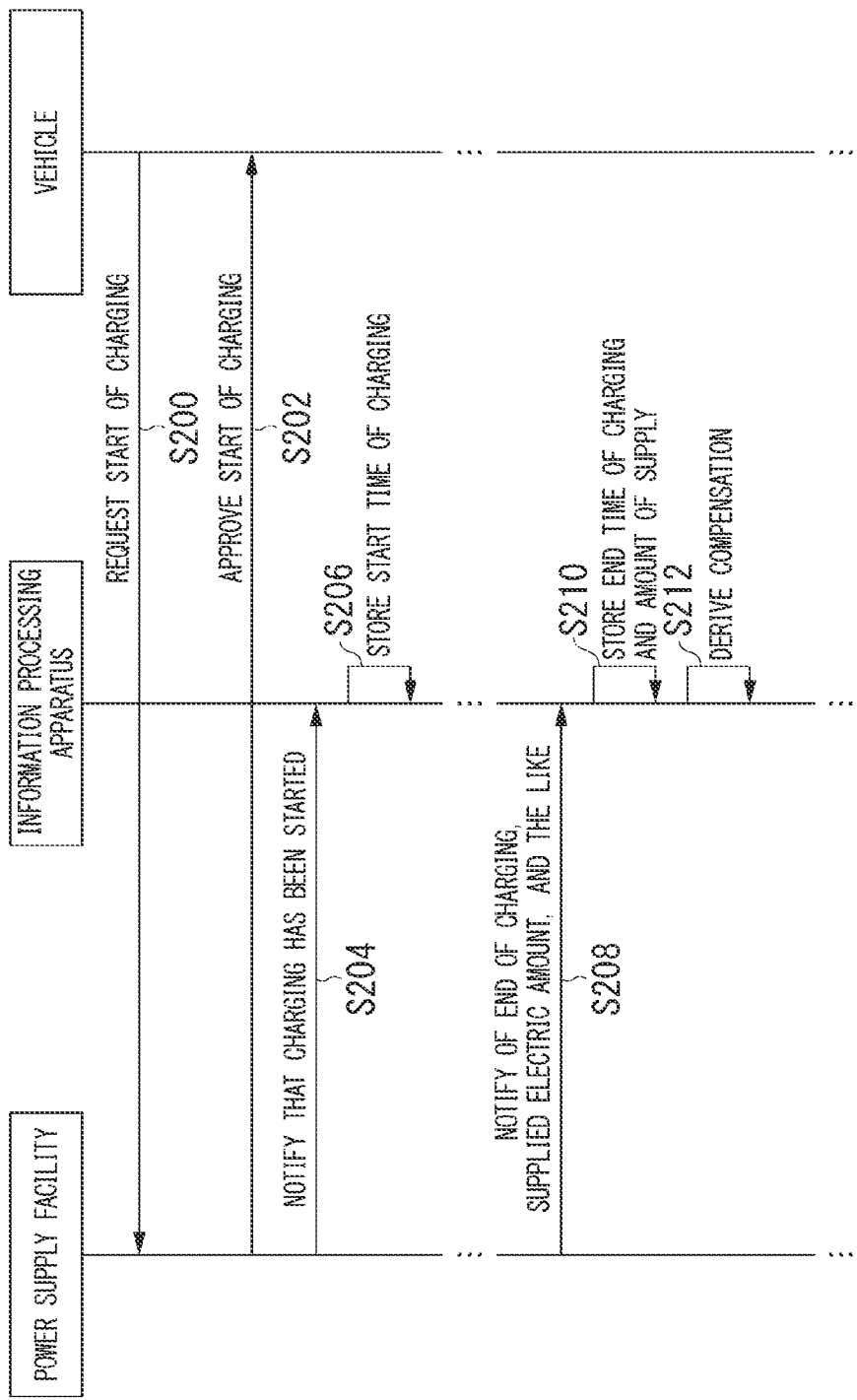
FIG. 11 is a sequence diagram (2) showing an example of the flow of a process executed by the information processing system.

FIG. 11 is a sequence diagram (2) showing an example of the flow of a process executed by the information processing system 1. The following process is a process that is executed after a reservation for charging is made.

In a case in which the vehicle M arrives at the power supply facility 200, and the battery B of the vehicle M is connected to the power feed unit 260 through power lines, the vehicle M communicates with the power supply facility 200 and transmits a first signal for requesting start of charging to the power supply facility 200 (Step S200). Next, the power supply facility 200 transmits a second signal for approving start of charging to the vehicle M in accordance with acquisition of the first signal (Step S202). At this time, in a case in which identification information included in the reservation information that has been acquired in advance from the information processing apparatus 300 coincides with identification information transmitted from the vehicle M, the power supply facility 200 may transmit the second signal to the vehicle M. In accordance with this, the power supply facility 200 supplies electric power to the battery B of the vehicle M through power lines connected to the vehicle M.

Next, the power supply facility 200 notifies the information processing apparatus 300 of the start of charging (Step S204). Next, the information processing apparatus 300 stores a start time of the charging in the storage 380 (Step S206). When a reversed time has elapsed, the power supply facility 200 ends charging and notifies the information processing apparatus 300 of the end of the charging and information of an amount of electric power supplied to the battery B and the like (Step S208).

Next, the information processing apparatus 300 stores an end time of the charging and the information of the amount of electric power supplied to the battery B and the like in the storage 380 (Step S210). Then, the information processing apparatus 300 derives a usage fee for a user of the vehicle M and a compensation to be paid to a manager of the power supply facility 200 on the basis of the information stored in the storage 380 (Step S212).

As described above, in a case in which the vehicle M has been charged by the power supply facility 200, the information processing apparatus 300 assigns a compensation of the charging to the manager of the power supply facility 200, whereby the degree of satisfaction and convenience of the manager are improved.

The information processing apparatus 300 may acquire a state of the facility battery 250 at the time of supplying electric power from the facility battery 250 to the battery B and detects an abnormality of the facility battery 250 on the basis of the acquired state. In such a case, the state of the facility battery 250 in a case in which the power supply facility 200 has charged the vehicle M is provided for the information processing apparatus 300. The state of the facility battery 250 in a case in which the power supply facility 200 has charged the vehicle M is the state of the facility battery 250 such as an amount of discharging per unit time, a temperature, an internal resistance value, and the like. In other words, this state is information that is used for detecting an abnormality.

In a case in which the state of the facility battery 250 deviates from a reference state by a predetermined degree or more, the information processing apparatus 300 determines that the facility battery 250 is abnormal. For example, in a case in which some or all of the amount of discharging per unit time, a temperature, and an internal resistance value deviate from a reference state by a predetermined degree or more, it is determined that the facility battery 250 is abnormal. In a case in which it is determined that the facility battery 250 is abnormal, for example, the information processing apparatus 300 causes a display of the power supply facility 200 (or a display of a mobile terminal device of a manager) to display information indicating presence of an abnormality. Then, in a case in which information indicating a request for maintenance is acquired in accordance with an operation of a manager of the power supply facility 200, the information processing apparatus 300 prepares maintenance. Here, the preparation is transmission of a request for maintenance to a predetermined device or generation of a maintenance schedule.

The facility battery 250 described above or the facility battery 250 that is a target for determining an abnormality may be a battery that was mounted in the vehicle before it is installed in the power supply facility 200 (a used battery). For example, the vehicle is a vehicle of a predetermined manufacturer affiliated with a management company of the information processing apparatus 300. For example, there are cases in which, after a battery that has been used in a vehicle is collected, and maintenance and the like of the battery are performed, it is used as the facility battery 250 through reuse. In such cases, the information processing apparatus 300 urges to use the facility battery 250 for charging the vehicle M as described above and performs maintenance of the facility battery 250. In accordance with this, a sense of security felt by a manager of the power supply facility 200 is improved.

Figure 12:
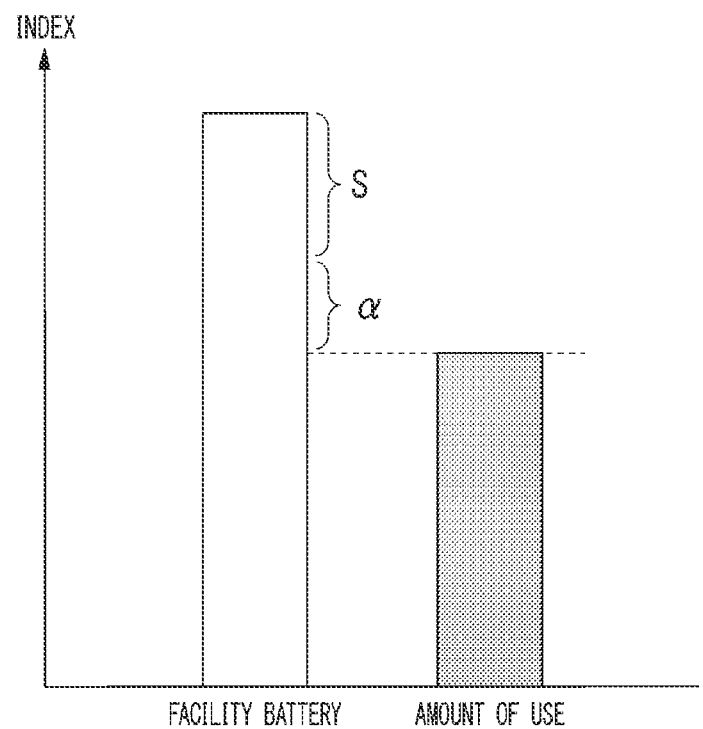
FIG. 12 is a diagram showing a surplus power.

Here, a surplus power of the facility battery 250 will be described. FIG. 12 is a diagram showing a surplus power. In FIG. 12, the vertical axis represents a first index that represents an electric power accumulated in the facility battery 250 and a second index that represents an amount of power estimated to be consumed by the power supply facility 200 in a predetermined period. For example, the surplus power is an electric power (S in the drawing) corresponding to an index acquired by subtracting an amount of power of the second index and a preliminary power amount (a in the drawing) from an amount of power of the first index.

Figure 13:
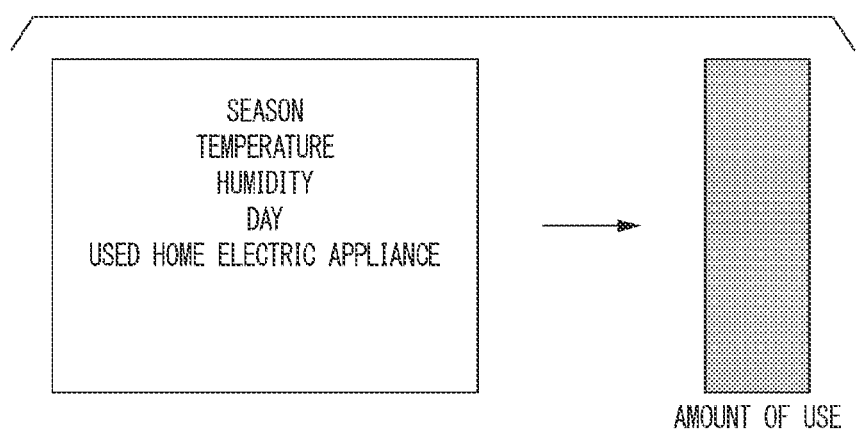
FIG. 13 is a diagram showing a technique for deriving a second index.

FIG. 13 is a diagram showing a technique for deriving the second index. For example, the second index is derived on the basis of a season at that time, a temperature, a humidity, day of the week, used home electric appliances, and a past power consumption, and the like. For example, an index acquired by statistically processing used amounts of power in the past and a use amount in an environment coinciding with an environment at that time (a season, a temperature, a humidity, day, a used home electric appliance is a predetermined home electric appliance) is set as the second index. A reference power amount set in advance may be set as the second index. The reference power amount is an amount of power derived on the basis of a power consumption amount of a facility similar to the target power supply facility 200 and an environment associated with the power consumption amount. A similar facility is a facility that has home electric appliances of a same degree as that of home electric appliances included in the power supply facility 200.

In addition, the information processing apparatus 300 may input various kinds of information (information of a season at that time, a temperature, a humidity, day, and a used home electric appliance) to a learned model and acquire a second index on the basis of information output by the learned model. The learned model learns various kinds of information and learning data in which the second index (correct answer data) is associated with the various kinds of information and is a model that is learned such that it outputs the second index associated with various kinds of information in a case in which the various kinds of information is input. The model is a model of a neural network or the like.

As described above, the information processing apparatus 300 derives a second index and derives a surplus power of the facility battery 250 having higher accuracy on the basis of the derived second index. In accordance with this, the surplus power of the facility battery 250 is promoted to be effectively utilized.

In the example described above, the power supply facility 200 is a house, and the amount of power consumed by the home electric appliance 280 is referred to for deriving a surplus power. However, in a case in which the power supply facility 200 is a store, the amount of power consumed by facilities for operating the store (for example, lighting for a business, an air conditioner for a business, and a refrigerator for a business) and the like is referred to in place of (in addition to) the home electric appliance 280, and, in a case in which the power supply facility 200 is a factory, the amount of power consumed by devices (for example, devices used for manufacturing a product) and the like in the factory is referred to in place of (in addition to) the home electric appliance 280.

The vehicle M that can use a service provided by the information processing system 1 may be a vehicle of a predetermined manufacturer or a vehicle of a manufacturer affiliated with a manager of the information processing apparatus 300. In this way, the manufacturer of the vehicle M provides the service described above for a user, whereby the convenience of the user of the vehicle M is improved. The manufacturer of the vehicle described above may be a manufacturer of the vehicle affiliated with the facility battery 250. For example, the battery B mounted in the vehicle M is reused, and is used as the facility battery 250. In such a case, the manufacturer of the vehicle described above is a manufacturer of the vehicle in which the facility battery 250 has been previously mounted. The battery B is reused, and the service is provided for a user of the vehicle M and a manager of the power supply facility 200, whereby the convenience of the user and the manager is improved, and reuse of the battery is efficiently performed.

According to the embodiment described, in a case in which a remaining level of the battery B is equal to or lower than the first threshold, the information processing apparatus 300 refers to the location information of the vehicle M and the location information of power supply facilities 200 and provides location information of a facility battery 250 of which a surplus power is equal to or higher than the second threshold and which is present within a predetermined distance from the vehicle M for the vehicle M, whereby convenience of a supplier of electric power and a consumer of electric power can be improved. For example, concern about insufficiency of electric for an occupant of the vehicle M power is resolved, the manager of the power charging facility 200 can acquire a compensation by supplying electric power to the vehicle M, and the degree of satisfaction of the manager is improved.

The embodiment described above can be expressed as below.

A control device including a storage device storing a program and a hardware processor and, by executing the program described above, is configured to acquire location information of one or more vehicles having only electric power of a first battery as a power source and a remaining level of electric power of the first battery, acquire information of a surplus power accumulated in a second battery that is installed in each facility among a plurality of facilities and is capable of supplying electric power to devices installed in the facility and location information of the facility, and provide the location information of the facility to the vehicle by referring to the location information of the vehicle and the location information of the facility in a case in which the remaining level of the electric power of the first battery is equal to or lower than a first threshold, the facility being in which the second battery of which the surplus power is equal to or higher than a second threshold is disposed and being present within a predetermined distance from a vehicle.

As above, although the form for performing the present invention has been described using the embodiment, the present invention is not limited to such embodiment at all, and various modifications and substitutions can be added within a range not departing from the concept of the present invention.

What is claimed is:

1. An information management apparatus comprising:
a memory that stores instructions, and
one or more processors that execute the instructions to:
acquire location information of one or more vehicles having electric power of only a first battery as a power source and a remaining level of the electric power of the first battery at first predetermined intervals,
acquire information of a surplus power accumulated in a second battery that is installed in each of a plurality of facilities and is capable of supplying electric power to devices installed in the facility and location information of the facility at second predetermined intervals,
in response to determining the remaining level of the electric power of the first battery is equal to or lower than the first threshold,
refer to the information of a surplus power, the location information of the vehicle, the location information of the facility, and a condition designated by a manager of the second battery,
extract the facility in which the second battery of which the surplus power is equal to or higher than a second threshold is disposed, being present within a predetermined distance from the vehicle, and in which the conditions is satisfied,
wherein the condition is that a power of the second battery of the facility is equal to or higher than a threshold,
wherein the thresholds associated with each of the plurality of facilities are different; and
provide the location information of the facility extracted to the vehicle.

2. The information management apparatus according to claim 1, wherein the facilities are facilities different from charging facilities used only for supplying electric power to mobile bodies including a vehicle and are houses, stores, or factories.

3. The information management apparatus according to claim 1, wherein the devices disposed in the facilities are home electric appliances disposed in a house, facilities that are disposed in a store for operating the store, or devices used for manufacturing a product in a factory.

4. The information management apparatus according to claim 1, wherein the one or more processors that are configured to execute the instructions to: assign a compensation to a manager of the second battery based on a supplied electric power in a case in which electric power accumulated in the second battery is supplied to the first battery.

5. The information management apparatus according to claim 1, wherein the surplus power is an electric power based on an index acquired by subtracting an electric power assumed to be used in the facility from the electric power accumulated in the second battery.

6. The information management apparatus according to claim 1, wherein the one or more processors that are configured to execute the instructions to: acquire a state of the second battery when the second battery is supplying electric power to the first battery and detect an abnormality of the second battery on the basis of the acquired state.

7. The information management apparatus according to claim 1, wherein the electric power accumulated in the second battery includes electric power provided by a power generation device that is disposed in the facility and generates power using sunlight.

8. The information management apparatus according to claim 1, wherein the second battery is a battery mounted in the vehicle before being installed in the facility.

9. An information processing method using a computer, the information processing method comprising:
    acquiring location information of one or more vehicles having electric power of only a first battery as a power source and a remaining level of the electric power of the first battery at first predetermined intervals;
    acquiring information of a surplus power accumulated in a second battery that is installed in each of a plurality of facilities and is capable of supplying electric power to devices installed in the facility and location information of the facility at second predetermined intervals;
    in response to determining the remaining level of the electric power of the first battery is equal to or lower than the first threshold,
    referring to the information of a surplus power, the location information of the vehicle, the location information of the facility, and a condition designated by a manager of the second battery;
    extracting the facility in which the second battery of which the surplus power is equal to or higher than a second threshold is disposed, being present within a predetermined distance from the vehicle, and in which the conditions is satisfied,
    wherein the condition is that a power of the second battery of the facility is equal to or higher than a threshold,
    wherein the thresholds associated with each of the plurality of facilities are different; and
    providing the location information of the facility extracted to the vehicle.

10. A non-transitory computer storage medium storing a program causing a computer to execute instructions to:
    acquire location information of one or more vehicles having electric power of only a first battery as a power source and a remaining level of the electric power of the first battery at first predetermined intervals;
    acquire information of a surplus power accumulated in a second battery that is installed in each of a plurality of facilities and is capable of supplying electric power to devices installed in the facility and location information of the facility at second predetermined intervals;
    in response to determining the remaining level of the electric power of the first battery is equal to or lower than the first threshold,
    refer to the information of a surplus power, the location information of the vehicle, the location information of the facility, and a condition designated by a manager of the second battery;
    extract the facility in which the second battery of which the surplus power is equal to or higher than a second threshold is disposed, being present within a predetermined distance from the vehicle, and in which the conditions is satisfied,
    wherein the condition is that a power of the second battery of the facility is equal to or higher than a threshold,
    wherein the thresholds associated with each of the plurality of facilities are different; and
    provide the location information of the facility extracted to the vehicle.

* * * * *